US008665087B2

(12) United States Patent  
Greene et al.

(10) Patent No.: US 8,665,087 B2
(45) Date of Patent: Mar. 4, 2014

(54) WEARABLE OR PORTABLE DEVICE INCLUDING SENSORS AND AN IMAGE INPUT FOR ESTABLISHING COMMUNICATIONS INTEROPERABILITY AND SITUATIONAL AWARENESS OF EVENTS AT AN INCIDENT SITE

(75) Inventors: Michael F. Greene, Amherst, NH (US); Christopher Roche, Amherst, NH (US); William E. Tonseth, Hudson, NH (US); Mihir D. Boal, Nashua, NH (US); William J. Delaney, Bedford, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1104 days.

(21) Appl. No.: 10/585,148

(22) PCT Filed: Nov. 10, 2005

(86) PCT No.: PCT/US2005/040876
§ 371 (c)(1),
(2), (4) Date: Jun. 29, 2006

(87) PCT Pub. No.: WO2006/053185
PCT Pub. Date: May 18, 2006

(65) Prior Publication Data
US 2009/0174547 A1 Jul. 9, 2009

Related U.S. Application Data

(60) Provisional application No. 60/626,570, filed on Nov. 10, 2004, provisional application No. 60/626,569, filed on Nov. 10, 2004.

(51) Int. Cl.
*G08B 1/08* (2006.01)
(52) U.S. Cl.
USPC ............ 340/539.13; 340/539.11; 340/539.26; 455/404.1; 455/404.2; 455/569.1; 455/90.2

(58) Field of Classification Search
USPC ............ 340/539.1, 539.2, 573.5, 573.6, 521, 340/539.11, 539.13, 825.49, 539.26; 455/404.1, 404.2, 569.1, 90.2
See application file for complete search history.

(56) References Cited

U.S. PATENT DOCUMENTS 5,252,979 A 10/1993 Nysen
5,404,577 A * 4/1995 Zuckerman et al. ......... 455/66.1
(Continued)

FOREIGN PATENT DOCUMENTS

EP 0 660 567 A3 8/1996

OTHER PUBLICATIONS

Scott F. Midkiff et al. "Rapidly-Deployable Broadband Wireless Networks for Disaster and Emergency Response". Presented at The First IEEE Workshop on Disaster Recovery Networks (DIREN '02) Jun. 24, 2002. New York City, NY.

(Continued)

Primary Examiner — Hoi Lau
(74) Attorney, Agent, or Firm — Daniel J. Long

(57) ABSTRACT

Common handheld transceivers operating on different frequencies with differing protocols can be provided with a mini module attached to the handheld transceiver that not only converts the audio information available from the handheld to the format and frequency of the temporary incident area network (20), the mini module also provides a sensor platform coupled to a wide variety of sensors whose data gathering capabilities in the vicinity of the individual are used to provide an incident commander or other individuals at nodes on the network with data to ascertain the conditions at the incident scene in the vicinity of the individual. Thus not only can information pertaining to the immediate health of and danger to emergency personnel be ascertained quickly, the transmission of sensor and image data over the same network provides situational awareness for the incident commanders and indeed for all those coupled to nodes on the network.

7 Claims, 14 Drawing Sheets

(56) References Cited

U.S. PATENT DOCUMENTS

| | | | |
|---|---|---|---|
| 5,566,362 A * | 10/1996 | Bauer et al. | 455/90.3 |
| 5,619,531 A | 4/1997 | Taylor et al. | |
| 5,729,680 A | 3/1998 | Belanger et al. | |
| 5,917,854 A | 6/1999 | Taylor et al. | |
| 5,937,176 A | 8/1999 | Beasley et al. | |
| 5,987,011 A | 11/1999 | Toh | |
| 5,987,024 A | 11/1999 | Duch et al. | |
| 6,115,580 A | 9/2000 | Chuprun et al. | |
| 6,223,053 B1 | 4/2001 | Friedmann et al. | |
| 6,229,818 B1 | 5/2001 | Bell | |
| 6,333,928 B1 | 12/2001 | Schaal et al. | |
| 6,338,087 B1 | 1/2002 | Okanoue | |
| 6,345,323 B1 | 2/2002 | Beasley et al. | |
| 6,353,745 B1 | 3/2002 | Wehrend et al. | |
| 6,415,330 B1 | 7/2002 | Okanoue | |
| 6,430,395 B2 * | 8/2002 | Arazi et al. | 455/41.2 |
| 6,472,982 B2 * | 10/2002 | Eida et al. | 340/539.1 |
| 6,480,480 B1 | 11/2002 | Du | |
| 6,574,266 B1 | 6/2003 | Haartsen | |
| 6,708,209 B1 | 3/2004 | Ebata et al. | |
| 6,769,767 B2 | 8/2004 | Swab et al. | |
| 6,807,165 B2 | 10/2004 | Belcea | |
| 6,930,608 B2 * | 8/2005 | Grajales et al. | 340/573.5 |
| 7,034,678 B2 * | 4/2006 | Burkley et al. | 340/539.13 |
| 7,091,851 B2 * | 8/2006 | Mason et al. | 340/539.13 |
| 7,091,852 B2 * | 8/2006 | Mason et al. | 340/539.13 |
| 7,149,499 B1 * | 12/2006 | Oran et al. | 455/404.2 |
| 7,245,216 B2 * | 7/2007 | Burkley et al. | 340/539.13 |
| 7,289,825 B2 * | 10/2007 | Fors et al. | 455/556.1 |
| 7,444,240 B2 * | 10/2008 | Macneille et al. | 701/300 |
| 7,508,840 B2 * | 3/2009 | Delaney | 370/466 |
| 7,885,291 B2 * | 2/2011 | Delaney | 370/466 |
| 2001/0010689 A1 * | 8/2001 | Awater et al. | 370/344 |
| 2001/0048364 A1 * | 12/2001 | Kalthoff et al. | 340/573.1 |
| 2002/0114286 A1 | 8/2002 | Iwamura et al. | |
| 2002/0191635 A1 | 12/2002 | Chow et al. | |
| 2003/0158954 A1 | 8/2003 | Williams | |
| 2004/0008116 A1 * | 1/2004 | Goehring | 340/573.1 |
| 2004/0072568 A1 | 4/2004 | Kim | |
| 2004/0147818 A1 * | 7/2004 | Levy et al. | 600/300 |
| 2004/0152494 A1 * | 8/2004 | Huang | 455/569.2 |
| 2004/0185902 A1 * | 9/2004 | Yang | 455/557 |
| 2004/0203437 A1 | 10/2004 | Burch et al. | |
| 2004/0209617 A1 | 10/2004 | Hrastar | |
| 2005/0001720 A1 * | 1/2005 | Mason et al. | 340/539.13 |
| 2005/0070313 A1 * | 3/2005 | Kaminsky | 455/462 |
| 2005/0096096 A1 * | 5/2005 | Birli et al. | 455/569.1 |
| 2005/0130593 A1 * | 6/2005 | Michalak | 455/66.1 |
| 2005/0136834 A1 * | 6/2005 | Bonta et al. | 455/11.1 |
| 2005/0232284 A1 * | 10/2005 | Karaoguz et al. | 370/401 |
| 2005/0237193 A1 * | 10/2005 | Namm et al. | 340/572.1 |
| 2005/0250553 A1 * | 11/2005 | Lim | 455/569.1 |
| 2005/0265256 A1 * | 12/2005 | Delaney | 370/254 |
| 2005/0273258 A1 * | 12/2005 | MacNeille et al. | 701/300 |
| 2006/0172769 A1 * | 8/2006 | Oh | 455/557 |
| 2007/0120671 A1 * | 5/2007 | Carmichael et al. | 340/572.1 |
| 2009/0116509 A1 * | 5/2009 | Delaney | 370/466 |
| 2009/0174547 A1 * | 7/2009 | Greene et al. | 340/539.13 |
| 2009/0196234 A1 * | 8/2009 | Greene et al. | 370/328 |
| 2009/0207852 A1 * | 8/2009 | Greene et al. | 370/465 |

OTHER PUBLICATIONS

Communications-Applied Technology. 2001.
ICRI—Incident Commanders Radio Interface. (Per Internet Archive: first appeared in Jan. 2002).

* cited by examiner

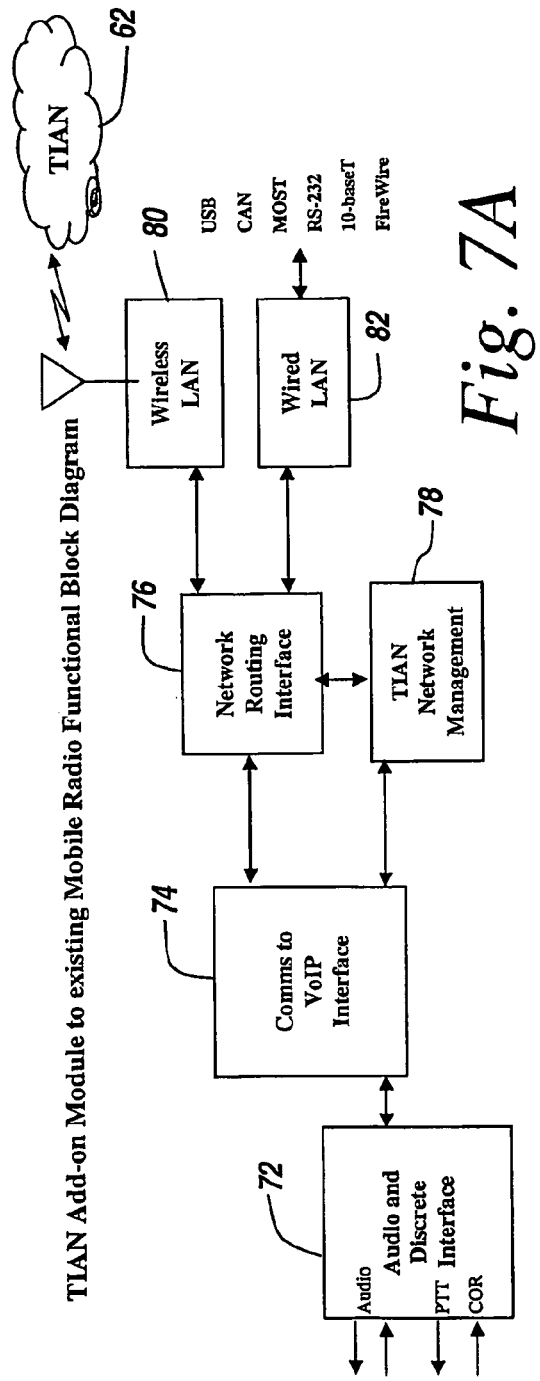
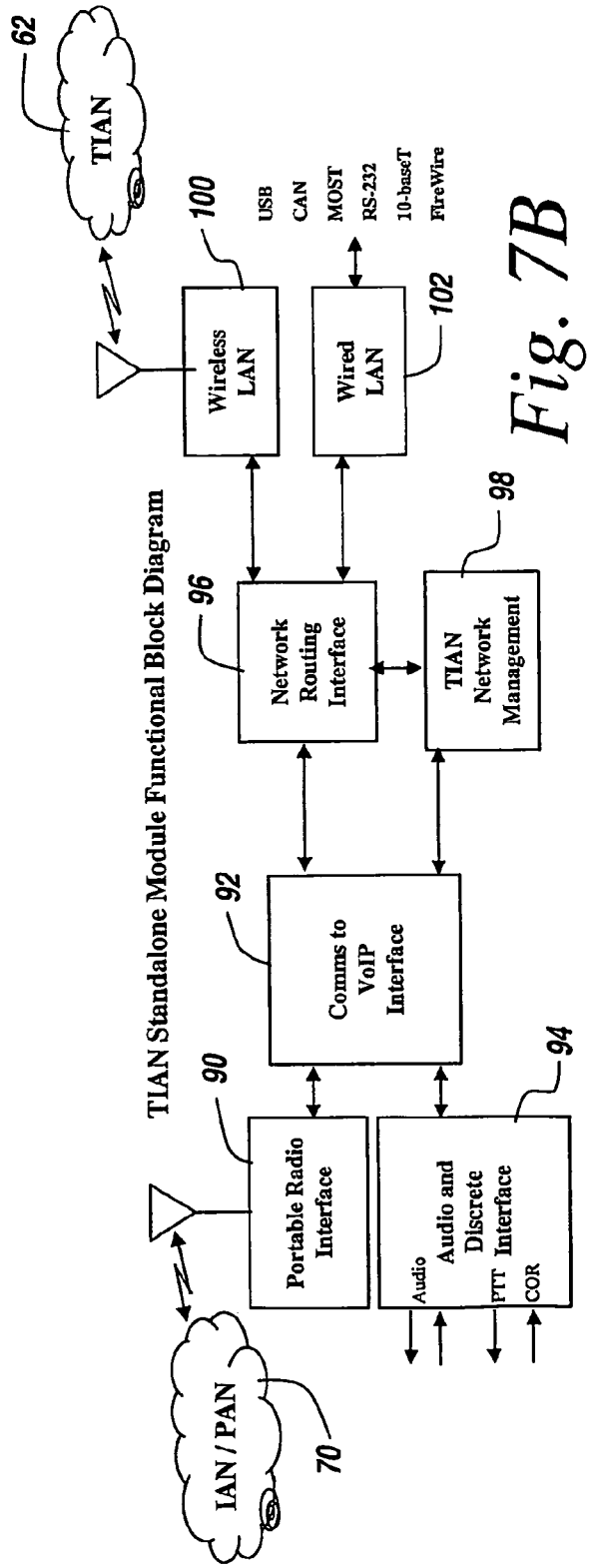

WEARABLE OR PORTABLE DEVICE INCLUDING SENSORS AND AN IMAGE INPUT FOR ESTABLISHING COMMUNICATIONS INTEROPERABILITY AND SITUATIONAL AWARENESS OF EVENTS AT AN INCIDENT SITE

RELATED APPLICATIONS

This Application claims rights under 35 USC §119(e) from U.S. Application Ser. No. 60/626,570 filed Nov. 10, 2004, and U.S. Application Ser. No. 60/626,569, filed Nov. 20, 2004, the contents of which are incorporated herein by reference. This application is related to U.S. patent application Ser. No. 10/943,323 filed Sep. 17, 2004 and Ser. No. 60/575,774 filed May 28, 2004, the contents of both of which are incorporated herein by reference.

FIELD OF THE INVENTION

This invention relates to a temporary incident area network in which modules are used to provide interoperability and more particularly to the use of wearable or portable mini modules as well as modules, wearable or not, connected to sensors or cameras to transmit the locally-collected data relating to the incident over the network.

BACKGROUND OF THE INVENTION

The above-referenced U.S. patent application Ser. No. 10/943,232 discloses an ad hoc emergency interoperability communication network which is established by providing universal temporary incident area network modules that communicate with each other on a network using a common frequency and modulation format such as provided by 802.11. In one embodiment the ad hoc network is established when vehicles containing the temporary incident area network modules are within range of each other. The temporary incident area network modules are such as to have an RF or other connection with handheld or in-vehicle communications devices of whatever variety that have standardized voice, data and push-to-talk channels. Upon receipt of a transmission from the standard transceiver, the signals are converted to the common network frequency and format and transmitted around the network. The system thus allows communications amongst the responders to an incident without having to set up prearranged protocols, equipment compatibilities, or equipment addressing.

Moreover, command and control structure can be achieved through a commander having access through his own temporary incident area network module at a node on the network to be able to route and control the flow of information over the network.

Additionally, portable temporary incident area network modules may be dropped at various locations to provide range extension for standard handheld transceivers that have a limited range. Moreover, in one embodiment, switches are provided on the transceivers for the individual to switch between the ad hoc temporary incident area network and the closed network of the department for whom the individual works.

Currently the information available to one department at an incident scene is only available to other departments if such departments talk to each other. Because communications interoperability problems may exist, it is not always possible for departments to talk with each other by means of the communications devices being utilized by first responders.

The above-mentioned ad hoc network solves these problems by providing the required interoperability.

In addition to the need for communications interoperability there is also a need for sensors and cameras at incident scenes to collect local data. It would be very advantageous to be able to transmit this local data to an incident commander for situational awareness. A variety of sensor devices are presently being utilized at incident scenes that include chemical and biological sensors, cameras and personal biological sensors. However, the outputs of these sensors are presently only verbally reportable, e.g., by reading device outputs out through the transceiver carried by emergency personnel.

A need, therefore, exists for an efficient way to provide sensor data and still or video images of an incident scene to an incident commander or other individuals on nodes of the network.

SUMMARY OF INVENTION

While the system described above involves the use of portable devices to serve as modules for the temporary incident area network; and while these portable devices may be placed at various positions about the incident area; and further, while these portable devices can extend the range of the normal handheld transceiver that communicates with these devices so as to increase its range, there persists a need to be able to extend inter-module communication and transmit a large amount of data from the incident site back to the incident commander or the incident commander's terminal to provide situational awareness, and for archiving.

By merely placing modules at various points at the incident site, one does not have the flexibility that a man-portable wearable device would have to provide a personally-carried communications and/or sensor platform to transmit on-the-spot information over the temporary incident area network. Note that this on-the-spot information includes verbal communications, sensor data, location data and images.

While traditional transceivers utilized by emergency personnel are battery-powered handheld devices for verbal communications, they are not used to transmit sensor data from the incident scene and the transmissions are not always able to penetrate the walls of buildings involved in the incident. Sensor devices equipped with RF transmission capability are also not able to penetrate the walls of some buildings. As a result, data collected at the scene, be it HAZMAT data, air quality data, biometric data or radiologic data, is only crudely transmitted to the incident commander by voice and is transmitted inconsistently. This is attempted by emergency personnel reading the instruments carted to the scene and calling out the readings through his or her handheld transmitter or HT device.

Aside from the fact that personnel from different departments may have incompatible transceivers, priory there has been no reliable ability to transmit sensor data or video to the incident commander either from a handheld device or even from modules used with the aforementioned temporary incident area network.

In order to provide for range extension and portability beyond that which is described above and in order to be able to transmit sensor and image data that can be shared by all the departments connected to the network, in the subject system each of the first responders' handheld units is provided with a reduced-size module clipped onto the handheld unit. In one sense this reduced-size module is a mini module and will be referred to as such hereinafter.

In one embodiment the subject mini module is clamped to the normal output pins or pads that serve as connectors to the outside world at the side of the handheld unit. These pins or pads include audio in, audio out, push-to-talk and power.

With the mini module clamped to the handheld transceiver all of the functions of the aforementioned modules are provided, plus the ability to interface with sensors and still or video image inputs. The sensors and image inputs are either directly coupled to the mini module or are connected by Blue Tooth, with the sensor and image data transmitted digitally on the same communications path established for interoperability, in one embodiment using the 802.11 or similar protocols.

Because of the wide bandwidth and speed of the 802.11 and similar protocols, multiplexed sensor and image data can be transmitted over the temporary incident area network to the incident commander as well as to other nodes on the network where the sensor and image data can be displayed.

In practice, the first responder is provided with a number of wearable sensors and/or a video or IR camera that records the crisis scene night at the individual's particular location. Note also that the individual's health in terms of vital signs can also be transmitted to the incident commander or others on the network. Moreover, the individual may be provided with apparatus that ascertains his or her location at the incident scene, and this location information can also be encoded, multiplexed and transmitted over the temporary incident area network.

The sensors and camera themselves may either be physically connected to the mini module that is clamped onto the handheld transceiver; or they may be connected to the mini module through Blue Tooth or similar links. This type of connection also applies to the larger in-vehicle or portable-type modules.

What is therefore provided is the ability of an individual to be a sensor platform as well as a communications platform that relays audio, data and image information over the temporary incident area network, where it is made available at network nodes to alert individuals to the conditions at a first responder. Because the transceiver to which the mini module is attached is lightweight and derives its power from its own batteries, deploying the transceivers with the clamped-on mini modules and sensors provides a one-man sensor and communications capability, thus to adapt simple audio communications transceivers to transmit sensor and image data over the temporary digital incident area network to which all of the transceivers are coupled.

Thus regardless of the type of handheld transceiver used by emergency personnel, its communication capability, coupled with an overlay of the sensor and image data from an attached mini module provides a convenient unit that may be distributed to the emergency personnel without interoperability concerns.

Moreover, the mini module may additionally contain its own power source or battery so that it need not rely on the state of charge of the transceiver to which it is attached.

In a further embodiment, a display device such as a computer, computer notebook, PDA or similar device is attached to the mini module so that the emergency personnel can be provided with a local readout of data as well as, for instance, other data on the network.

The types of sensors that may be located at or adjacent the individual include location sensors, oxygen tank sensors, gas sensors, HAZMAT sensors, RFID tags, photo ionization sensors, a video or IR camera, and/or biometric sensors.

With the individual carrying a wearable sensor pack and with the sensor pack coupled to the mini module attached to the handheld transceiver, it is possible to provide a man-portable sensor platform that surveys the scene and provides information over the temporary incident area network to the incident commander and/or other departments at nodes on the network, thus to promote both situational awareness and archiving.

It will be appreciated that as with the originally described temporary incident area network, the type of communications transceivers used by the various departments or groups that respond to a crisis situation need not be compatible with any of the other transceivers. What makes for the compatibility is the use of modules that take information from the transceivers and converts it to a common format and frequency for transmission around the network. Conveniently, this is done in digital form and in one embodiment uses the 802.11 protocol.

Since the 802.11 protocol is universal, interoperability is achieved and with the digital throughput available from 802.11, not only can audio communications between the first responders be circulated over the ad hoc network, so too can be the sensor and image data gathered at each of the individuals.

In summary, common handheld transceivers operating on different frequencies with differing protocols can be provided with a mini module attached to the handheld transceiver that not only converts the audio information available from the handheld to the format and frequency of the temporary incident area network, the mini module with sensors connected also provides a sensor platform whose data gathering capabilities in the vicinity of the individual are used to provide an incident commander or other individuals at nodes on the network with data to ascertain the conditions at the incident scene in the vicinity of the individual. Thus not only can information pertaining to the immediate health of and danger to emergency personnel be ascertained quickly, the transmission of sensor and image data over the same network provides situational awareness for the incident commanders and indeed for all those coupled to nodes on the network, as well as providing an archiving function.

BRIEF DESCRIPTION OF THE DRAWINGS

These and other features of the subject invention will be better understood in connection with a Detailed Description, in conjunction with the Drawings, of which:

FIGS. 7A and 7B are functional block diagrams of the subject temporary incident area network for add-on and standalone embodiments of the subject invention;

DETAILED DESCRIPTION

In order to facilitate the description of the subject invention, the following definitions are provided:

Extended Area Network (EAN)—The city systems are in turned linked with county, regional, state, and national systems or extended area networks.

Jurisdiction Area Network (JAN)—The JAN is the main communications network for first responders. It provides a communication path for all first responder's communication units within a specific agency. Examples of a JAN are the communication system used by the NH State Police that is different from the JAN communication system used by the Hudson Fire Department that is different from the communication system used by the US Border Patrol.

Incident Area Network (IAN)—An incident area network is a network created for a specific incident by the responding agency. This network is temporary in nature and comprises all of the first responders from a specific agency. For example, the Hudson Fire Department will create an IAN so that all of their fire fighters can communicate at the local scene. The Hudson Fire Department IAN will not interoperate with the Hudson Police Departrnent's IAN that is being used at the same scene to allow the responding policemen to communicate over.

Temporary Incident Area Network (TIAN)—As public safety individuals and resources, such as ambulances and fire engines, come into an incident, the TIAN modules will automatically recognize the new responder, register them into the network, and authorize the network resource for communications and information exchange. The TIAN modules will provide a gateway function between each of the agencies IAN at the local scene.

Personal Area Network (PAN)—On the small scale, the PANs consist of network devices that interact with other devices that belong with the public safety individual. A first responder may be equipped with devices that are used to monitor the first responder's physical location, pulse rate, breathing rate, oxygen tank status, as well as devices for hazardous gas detection and voice communications. The devices are linked on a personal area network controlled by the first responder's communication unit.

Figure 1:
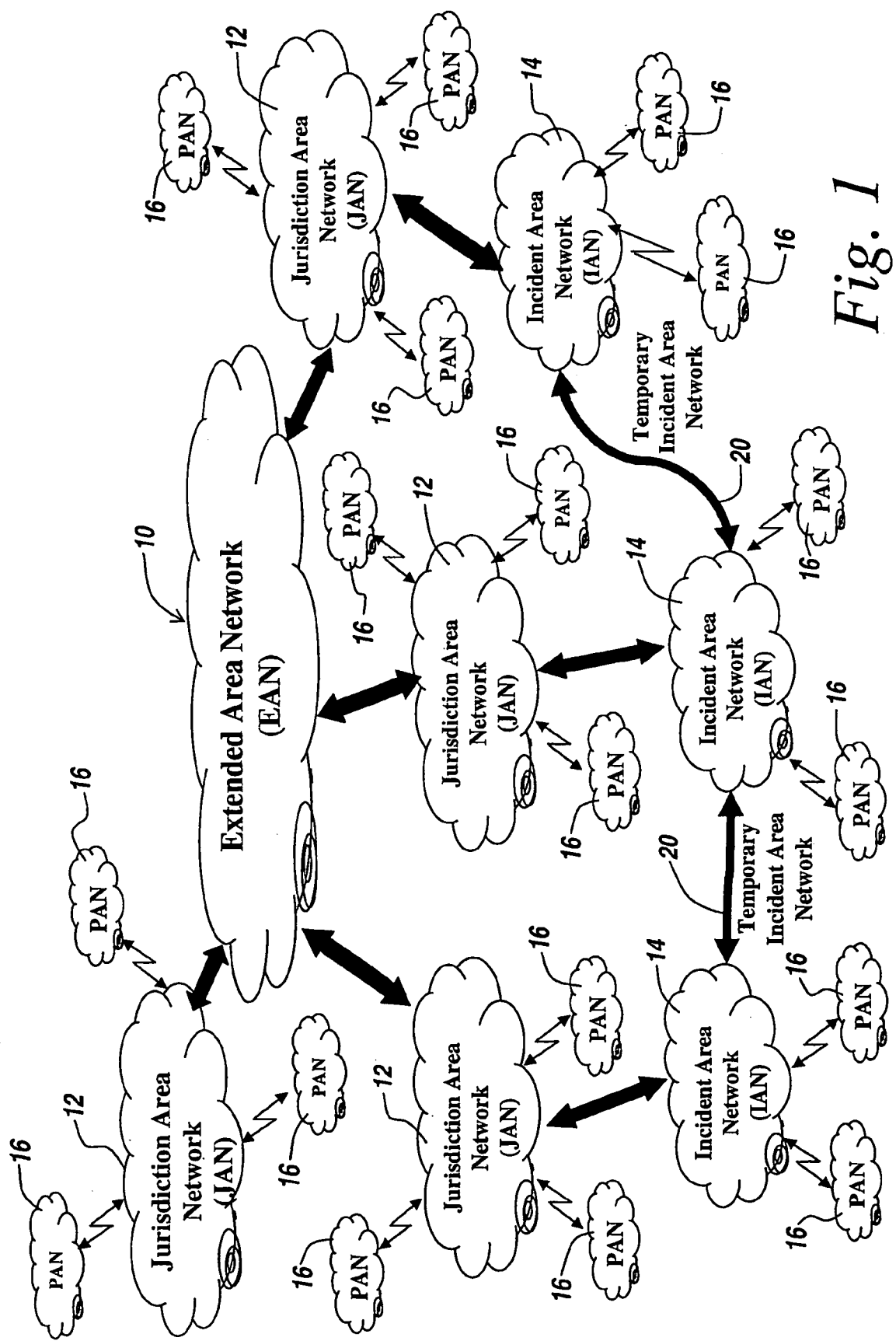
FIG. 1 is a hierarchical network structure diagram starting with an extended area network, and going down through a jurisdiction area network, to a personal area network connected to the other networks through an incident area network.

As to the original ad hoc temporary incident area network that offers interoperability, referring now to FIG. 1, communication elements and the interconnection between elements as depicted as an hierarchal network structure with a PAN being the lowest level and an EAN being the highest level.

As can be seen in this figure, an extended area network 10 is coupled to jurisdictional area networks 12 that are in turn coupled to incident area networks 14 as illustrated. PANs 16 are coupled to respective incident area networks or jurisdiction area networks, with the incident area networks being interconnected by a temporary incident area network designated by reference character 20 as will be described.

IANs are created at the scene of an incident and each first responder's agencies may create their own independent IANs. The isolated IANs are typically due to communication unit's dissimilar operating frequencies and protocols. The temporary incident area network connections are created by the TIAN modules to provide interoperability between IANs at a scene of incident.

Figure 2:
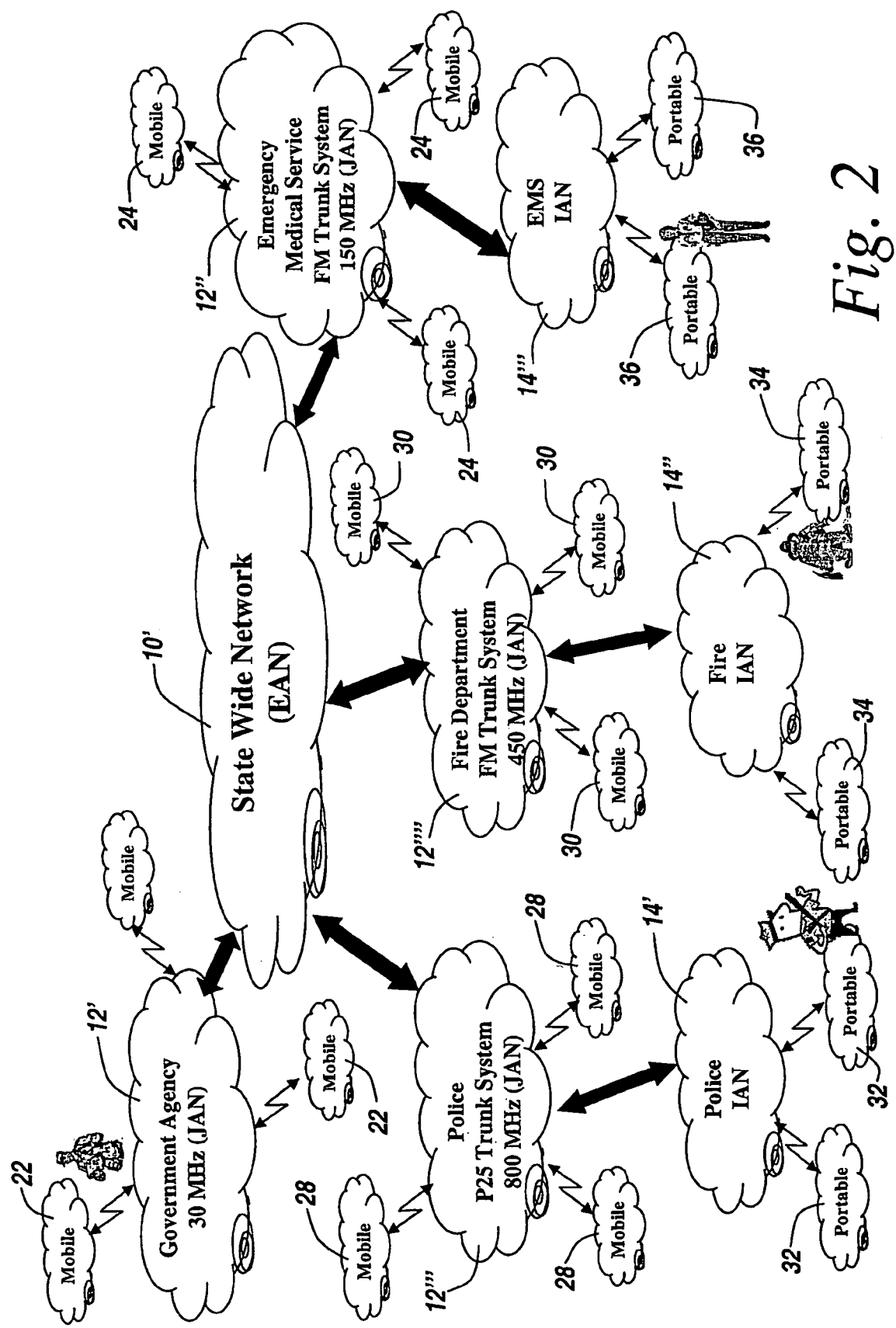
FIG. 2 is a hierarchical network structure diagram for an incident involving police and fire departments using the topology of FIG. 1.

Referring now to FIG. 2, for an everyday scenario it can be seen that a statewide network 10' constitutes the extended area network for a particular scenario that can involve governmental agency 12' forming a JAN that communicates with its PANS 22, which may be mobile units operating, for instance, at 30 MHz. Another JAN 12" constitutes an emergency medical network using an FM trunk system at 150 MHz, which has its mobile units 24 connected thereto by RF links or otherwise. A further JAN 12'" could be a police network using a P-25 trunk system operating at 800 MHz, with its mobile units 28 connected thereto. Likewise in the incident, a still further PAN 12" " might be a fire department using an FM trunk system operating at 450 MHz, with its mobile units 30 also connected to the fire department trunk system.

The police, fire department and EMS units may desire to set up incident area networks, with the police IAN identified by reference character 14', the fire IAN by reference character 14" and the EMS IAN by reference character 14'".

Each of the IANs supports portable units respectively 32 for the police, 34 for the fire, and 36 for the EMS.

In operation, if one applies the communication systems that are available today for an everyday scenario like a residential fire call, the communication-elements may be as illustrated. For the Policemen to communicate with the Firemen, the communication path is from the Policemen's communication unit (portable radio) through the Police IAN to the Police JAN to the county's EAN to the Fire JAN to the Fire IAN and finally to the Firemen's communication unit. Communication routing between the Firemen and EMS personnel is also as complex. Most of the communication path is away from the local incident with vulnerabilities such as access point congestion and message delays. The use of the ad hoc TIAN right at the local scene relieves the problems associated with an extended communication path away from the local incident.

As mentioned hereinbefore, responding to a local incident has involved rolling in specialized communication vehicles or distributing portable radios or PAN devices that interoperate. Moreover, there are everyday operation issues associated with these approaches. Specialized vehicles are expensive, limited, and may take time to arrive at the scene and more time to setup the temporary network. Distributing specialized PAN devices also has everyday operational issues such as programming and configuration as well as lack of user familiarity.

Figure 3:
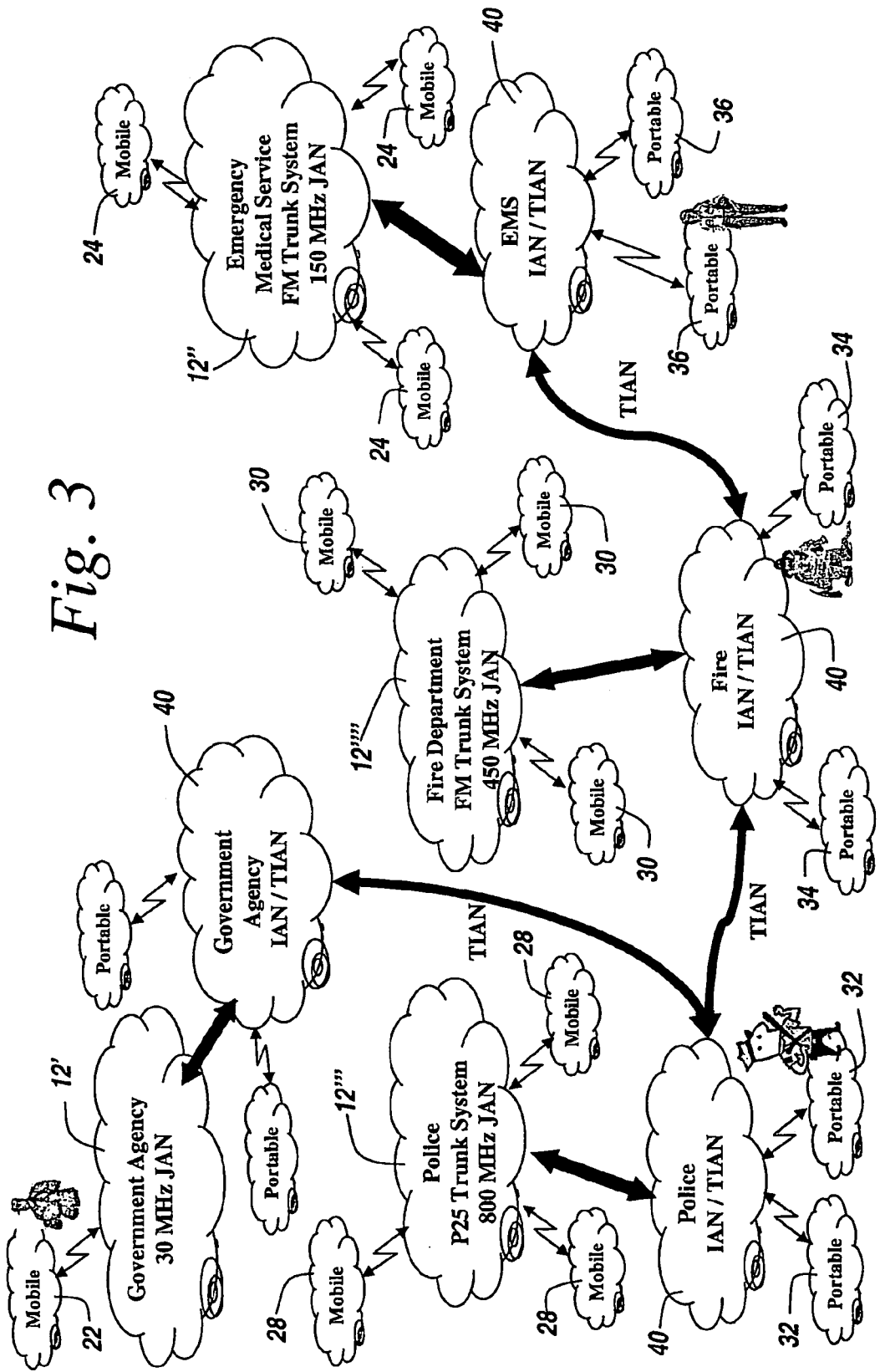
FIG. 3 is a hierarchical network structure diagram in which the incident area networks of FIGS. 1 and 2 are established by the subject temporary incident area network modules.

As shown in FIG. 3, as can be seen, each of the governmental agencies, police departments, fire departments or EMS units, substitutes for their IAN a temporary incident area network or TIAN 40. This is accomplished by the use of universal TIAN modules that provide each of the entities with the ability to intercommunicate. Although each IAN/TIAN can communicate directly over their own proprietary network with its corresponding intergovernmental agency, such as JAN 12', JAN 12'', JAN 12''' and JAN 12'''', it is the links between the universal TIAN modules that provide the ad hoc network.

Thus, all communications between all of the agencies and personnel are routed through the TIAN modules. As illustrated, the temporary incident network area or TIAN of the subject invention solves the temporary network issue by building a temporary local area network to interconnect IANs right at the scene of the incident. This is accomplished by adding TIAN modules into an incident area network or IAN. When the first responder arrives at the scene, the TIAN module within the first responder's vehicle establishes a TIAN and monitors for other first responders to arrive at the scene of incident. As other responders arrive, their TIAN module connects to the TIAN in an ad-hoc fashion. The TIAN modules automatically share their JAN/PAN personalities and then communication is established between IANs and PANs. Voice, data, and video may be shared between PANs over the TIAN.

When the Incident Commander (IC) arrives at the scene, the IC's temporary incident area network system will connect over the temporary incident area network TIAN and then will be presented with information on all of the subscribers on his PAN device. The IC can than take command of the scene and communicate with all of the first responders. The IC may create various talk groups among the responders, obtain status of all subscribers, and take command of the incident.

Figure 4:
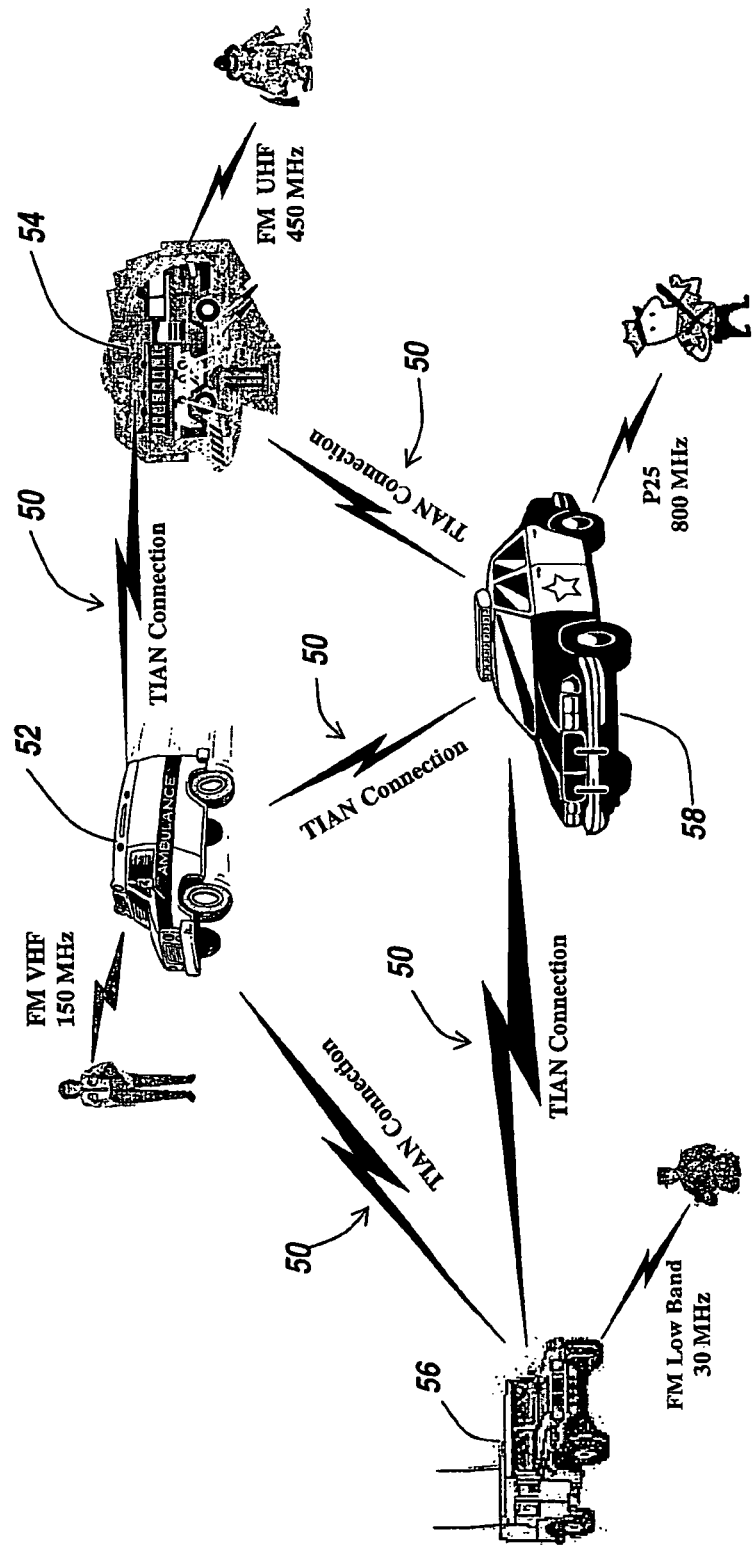
FIG. 4 is a diagrammatic illustration of the elements of a temporary network connections formed by first responders comprising police, military, EMS and fire personnel as they converge on an incident.

Referring now to FIG. 4, what is shown are the connections associated with a temporary incident area network. Here it can be seen that TIAN connections 50 are established, for instance, between an ambulance 52 operating with an FM-VHF carrier at 150 MHz, which may wish to communicate, for instance, with fire department personnel in a fire truck 54, which is designed to operate over an FM-UHF 450 MHz channel. Likewise, military personnel, for instance, in a Hum-V 56 that normally communicates over an FM low band at 50 MHz may wish to communicate with a squad car 58 that usually communicates with its personnel on the P-25 800 MHz channel.

What can be seen is that each of the entities shown in FIG. 4 communicates with its personnel over its own dedicated proprietary network, each with a different frequency, to say nothing of different protocols.

If one breaks down the TIAN into a lower level, what is actually happening is that a temporary ad hoc wireless area network is established between each of the responding vehicles right at the scene of incident as shown in FIG. 4. Each vehicle's TIAN module is a node within the mesh network and can be used for routing traffic and extending the networks range. Applying adaptive routing protocols, quality of service, and bandwidth broker techniques optimized the TIAN throughput and efficiency.

Temporary Incident Area Network System and Operation

Figure 5:
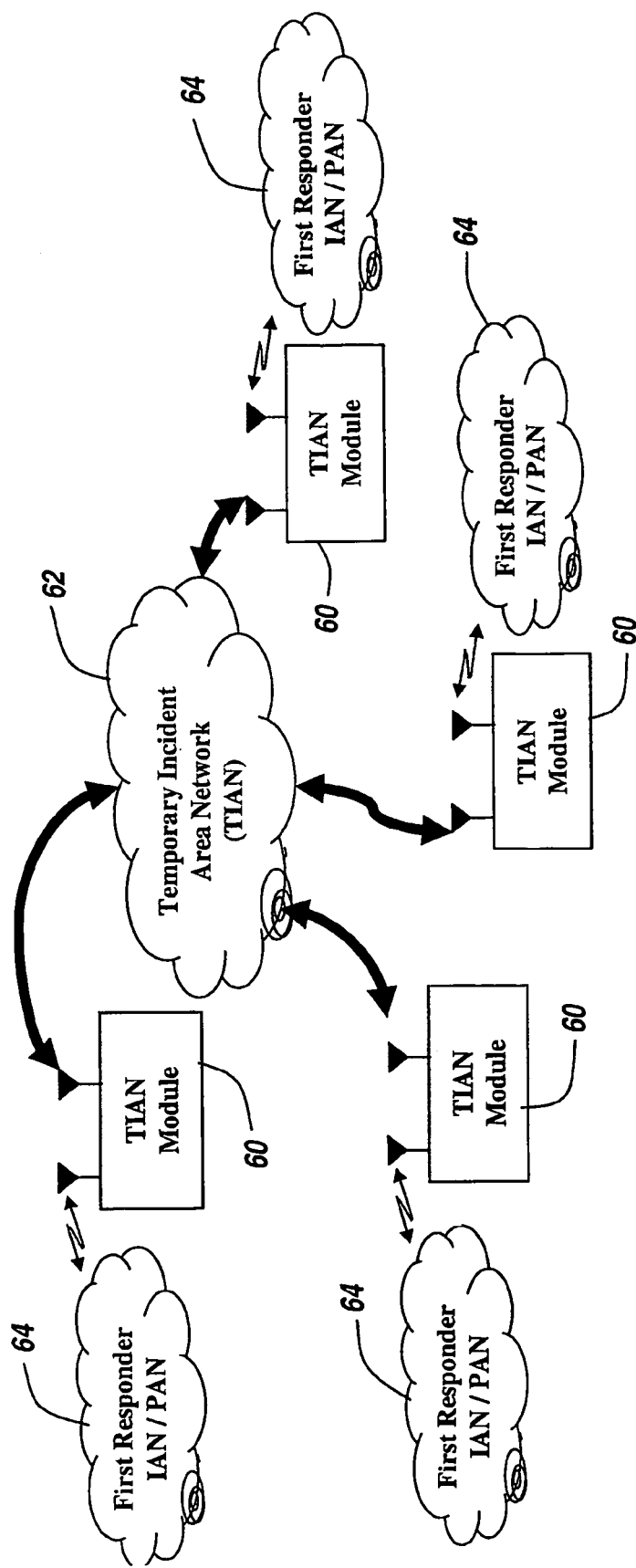
FIG. 5 is a diagrammatic illustration of the use of temporary incident area network modules to interconnect personal area network communications devices.

As shown in FIG. 5, a TIAN system consists of a number of TIAN modules 60 that form a temporary area network 62 and provide a gateway to dissimilar IANs. The TIAN system allows mutually exclusive first responder PANs 64, usually comprising portable radios, to interoperate at a local scene. Here each of the first responders is provided with the subject universal TIAN module.

Temporary Incident Area Network Module

Figure 6A:
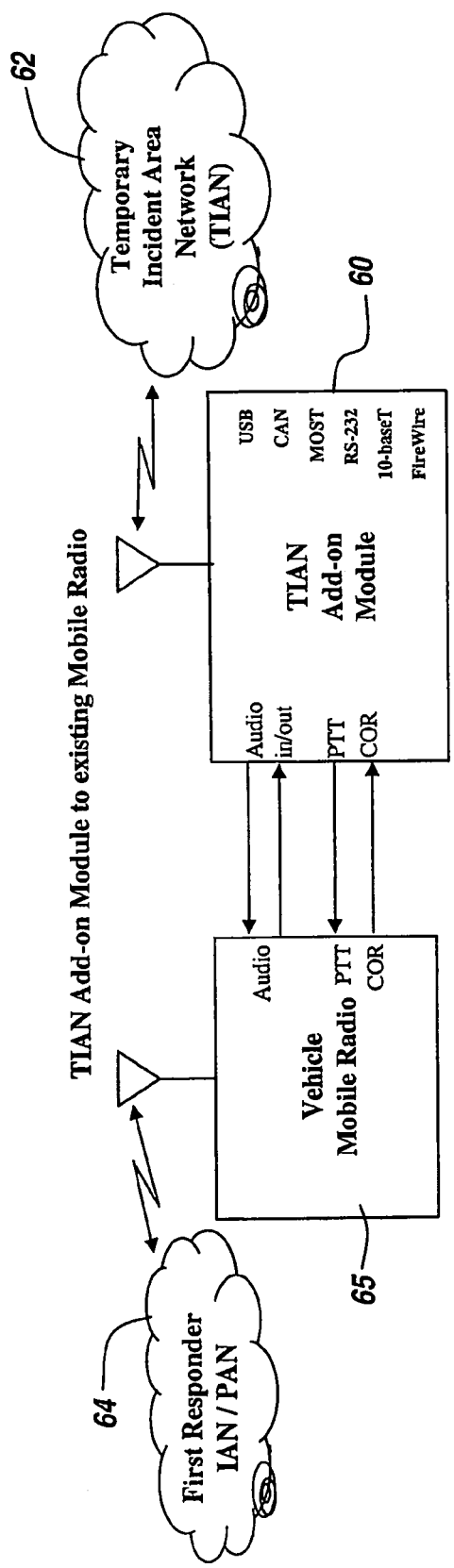
FIGS. 6A and 6B are diagrammatic illustrations respectively of add-on modules to existing mobile radios or standalone modules.
Figure 6B:
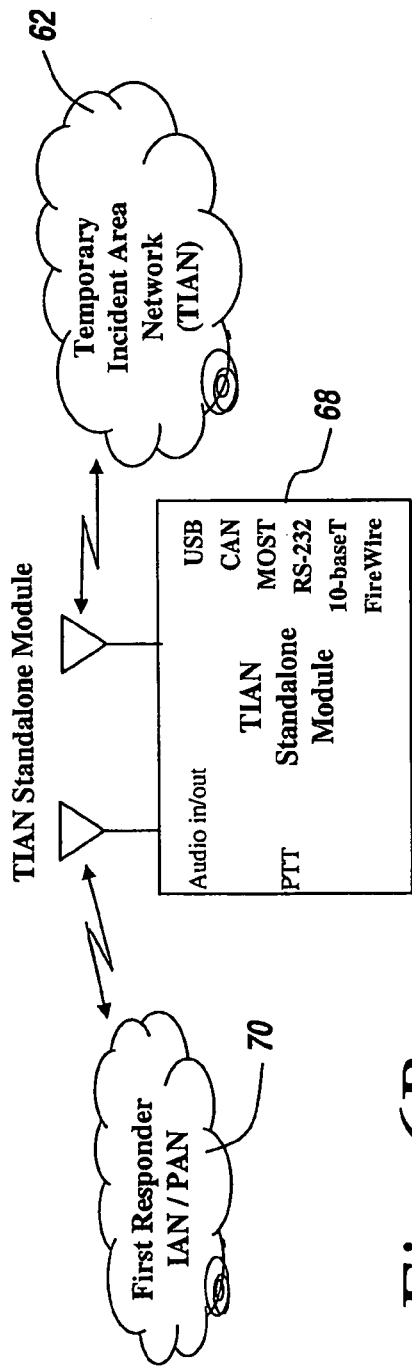

Referring to FIGS. 6A and 6B, in one embodiment the TIAN module 60 will reside within the first responder's vehicle as an add-on to the existing vehicular mobile radio 65 or as a standalone system 68. The TIAN add-on module interfaces to mobile radio 65 through standard Audio, PTT, and optional Carrier Operated Relay or COR interfaces while the TIAN standalone system 68 provides the wireless interface to the first responder's PAN, here illustrated at 70.

The TIAN module will optionally provide standard wire network interfaces or standard automotive network interfaces. The network interfaces can provide a laptop interface, mobile radio control interface, vehicle electronics interface, camera interface, or allow the TIAN module to act as a gateway between public safety electronic equipment.

Referring now to FIGS. 7A and 7B, TIAN functional block diagrams are presented. The add-on vehicular mobile radio interface is provided through the Audio and Discrete Interface 72. The Audio and Discrete Interface 72 is coupled to a Comms-to-voice voice-over IP interface or VoIP interface 74, which is in turn interconnected to a network routing interface 76 and also to a TIAN network management 78. The network interface is interconnected to a wireless LAN 80 or to a wired LAN 82, in one embodiment using a USB, CAN, MOST, RS-232, 10-based T and fire-wire protocols.

As to the standalone version of the subject system, a portable radio interface 90 is coupled to a Comms-to-VoIP interface 92, with an Audio and Discrete Interface 94 also interconnected with the Comms-to-VoIP interface. VoIP interface 92 is also coupled to a network routing interface 96 and to a TIAN network management 98 similar to the network routing interface 76 and TIAN network 78 for existing mobile radio functionality. Likewise, the network routing interface is interconnected with wireless LAN 100 and wired LAN 102, as was the case with the existing mobile radio scenario.

In operation, the Audio and Discrete Interface provides audio to digital conversion and digital and audio conversions with associated audio processing and filtering that is required in the public safety environment. Discrete signals are also provided to activate the vehicular mobile radios put-to-talk signal and to monitor the Carrier Operated Relay signal.

The Portable Radio Interface 90 is part of the temporary incident area network standalone system to support the ANSI/TIA-603-B Land Mobile FM or PM Communication Interface and the ANSI/TIA/IA 102 APCO Project 25 Common Air Interface in direct system mode.

The Comms to VoIP Interface function provides the all of the VoIP functionality as well as voice detection processing. The voice detection processing monitors the audio signal input from the Audio and Discrete Interface and when audio is detected the Comms to VoIP Interface function processes the voice and generates VoIP packets that are transmitted to the Network Routing Interface. When the Comms to VoIP Interface function receives VoIP packets from the Network Routing Interface function, the VoIP packets are processed, the PTT signal is activated, and the audio signal is passed to the Audio and Discrete Interface audio output.

The Network Routing Interface provides the network routing function and data-streaming path between the TIAN modules functions. The Network Routing Interface receives routing configurations from the Temporary Incident Area Network Management function.

The Wireless LAN function provides the wireless interface to other TIAN modules. This function conforms to standard wireless protocols and air interfaces such as WiFi, 802.11, Blue Tooth, and/or TIA-902. The Wireless LAN function provides a level of security.

The Wired LAN function provides an interface to standard network wire interfaces. The standard wire interfaces can provide vehicle electronic equipment broader band access over the TIAN at the scene of incident than can be achieved through the current Public Safety wireless infrastructure. Vehicle electronic equipment can include laptop computers, siren control panels, vehicle accessories, vehicle sensors, video cameras, video monitors, personal area network, local wire-line access, and cellular radio equipment.

The Temporary Incident Area Network Management function provides the all of the operational mode processing that will be described in the following section.

Temporary Incident Area Network Operational Mode Processing

The TIAN is an ad-hoc network that is temporally set up for the transfers of voice, data, and video between dissimilar first responders' IANs and PANs. The TIAN ad-hoc network is a fully distributed network that automatically operates with no centralized coordination and with minimal control overhead. Self-organizing, multicasting, and mobility are key features of the network to provide transparent real time point-to-multipoint and multipoint-to-multipoint voice and data communications.

Figure 8:
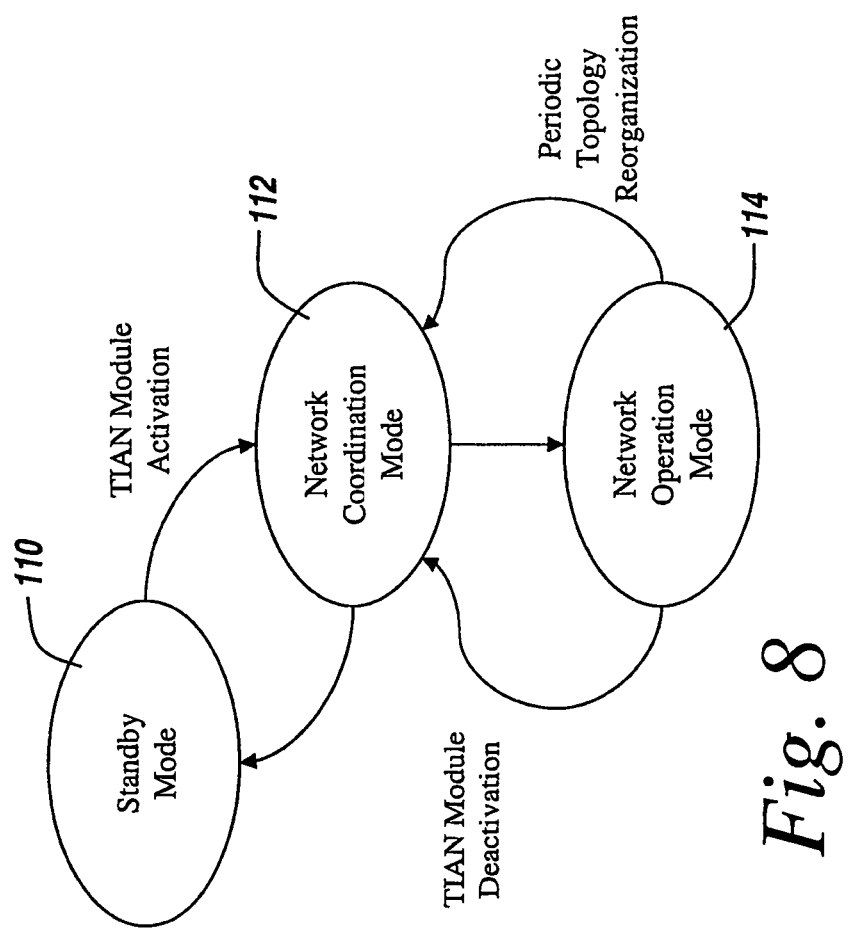
FIG. 8 is a network operational flow diagram for the subject temporary incident area network.

FIG. 8 provides the functional flow between the TIAN module's operational modes. In this figure, a Standby Mode 110 is shown interconnected to a Network Coordination Mode 112, in turn interconnected with a Network Operation Mode 114, with the diagram describing TIAN mobile module activation, TIAN module deactivation and periodic topology reorganization. The standby mode is the inactive state with the TIAN module asleep, with no active RF transmissions or RF reception. The Network Coordination Mode activates when the TIAN module is establishing, connecting, or updating the TIAN configuration. The Network Operation Mode is the state when the TIAN module is providing the gateway between the first responder's IAN/PAN and the TIAN.

Network Coordination Mode

After power is applied to the TIAN module and prior to arriving at the scene of incident, the TIAN module is in the standby mode. When the First Responders arrive at the scene of incident, they activate their TIAN modules by manually toggling a switch as they leave the vehicle or by an automatic process such as the depressing of the emergency break, driver seat sensor, placing the vehicle in park, or turning off the vehicle.

Figure 9:
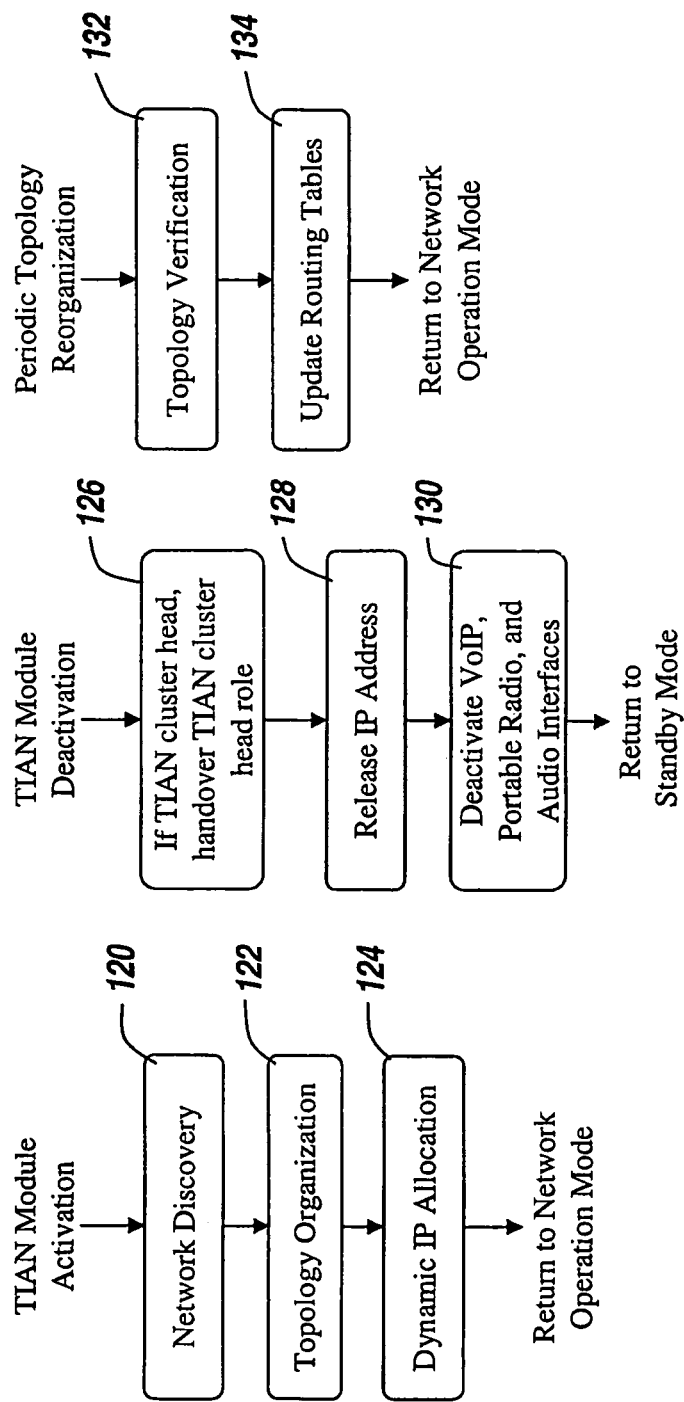
FIG. 9 is a flow chart illustrating the network coordination function of the subject temporary incident area network.

As illustrated in FIG. 9, once the TIAN module is activated, it will immediately enter the Network Coordination Mode and begin the network discovery phase 120 of operation. As shown, the discovery phase may be through a short packet transmission or beacon; or by sniffing the RF channel for network activity. When a network is discovered, the TIAN module enters the topology organization phase 122 where it collects information about their neighbors and the network. The module passes the TIAN module's identity and associated JAN/IAN parameters that the TIAN module is supporting. The topology reorganization phase is periodically performed so that node status can be updated and so that major topology changes can be detected and corrected.

Note that because each node within the TIAN must have a unique IP address, there is a dynamic IP allocation step 124 which is accomplished, upon which the system is returned to a network operation mode.

As illustrated at 126, for TIAN mode deactivation, if the TIAN cluster head leaves the scene, then it is necessary to hand over the TIAN cluster head roll, which involves releasing all IP addresses as illustrated 128 and deactivating VoIP portable radio and audio interfaces as illustrated at 130, at which point the system returns to the Standby Mode.

For periodic topology reorganization, as illustrated at 132, there is a topology verification mode and upon verification, routing tables are updated as illustrated at 134. After the periodic topology reorganization, the system is returned to the Network Operation Mode.

As noted above, each node within the TIAN must have a unique IP address to participate in the TIAN. Since the TIAN does not support a centralized coordination, a Dynamic Host Configuration Protocol (DHCP) cannot be supported. So a hierarchical network approach may be employed with the first module that arrives at the scene assuming the cluster head node role. When new TIAN modules arrive and discover the TIAN, they will register with the TIAN cluster head and the TIAN cluster head will allocate a new address and coordinates in a duplicate address (DAD) process. When the TIAN cluster head node is de-energized, it will automatically pass the cluster head role to a neighboring node prior to leaving the TIAN.

After the Network Coordination Mode has registered with and established a connection within the TIAN, the TIAN module will transition into the Network Operation Mode.

Network Operation Mode

Figure 10:
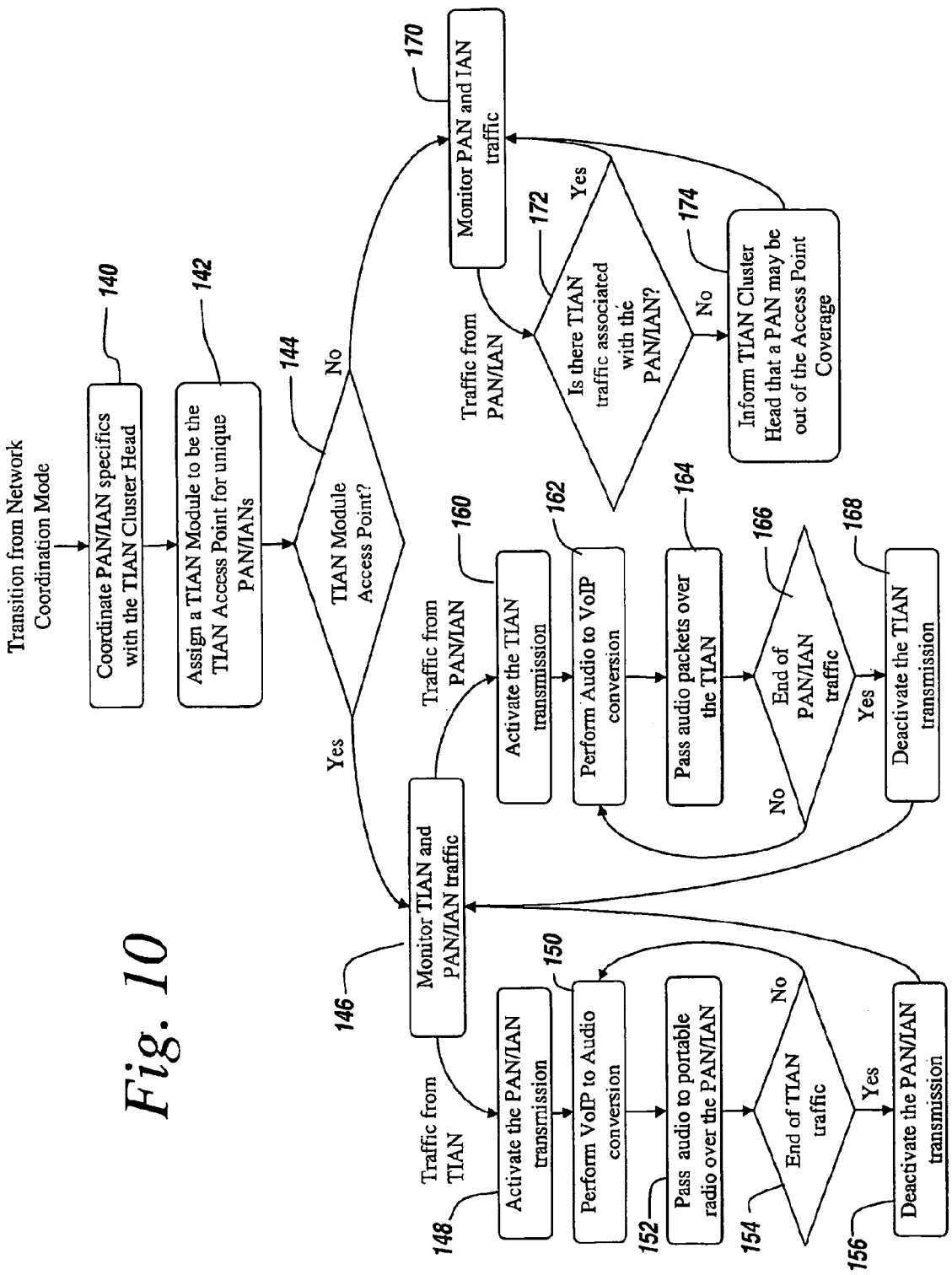
FIG. 10 is a flow chart showing the functional flow of the subject system in the networking operation mode.

Referring to FIG. 10, in terms of the network operating function, the transition from the Network Coordination Mode results in the coordination of PAN/IAN specifics within the TIAN cluster head, as illustrated at 140. Thereafter, the system assigns a TIAN module to be the TIAN access point for unique PAN/IANs as illustrated at 142. The system then determines whether or not there is a module access point as illustrated at 144. If there is, then as illustrated at 146 the system monitors the TIAN and PAN traffic. If there is traffic from the TIAN, then as illustrated at 148 the system activates the PAN/TIAN transmission, followed by performing VoIP to audio conversion at 150, which in turn passes the audio to portable radios over the PAN/IAN 152. A decision is made at 154 as to whether or not there is an end to TIAN traffic and if not, the unit 150 performs its indicated VoIP-to-audio conversion again. If there is an end to the traffic, then as illustrated 156, the system deactivates the PAN/IAN transmission and provides an indication to monitor 146.

If there is traffic from the PAN/IAN, then as illustrated at 160, the system activates the TIAN transmission, performs audio to VoIP conversion at 162 and passes audio packets over the TIANs as illustrated at 164. At the end of the PAN/IAN traffic, as illustrated at decision block 166, the system deactivates the TIAN transmission as illustrated at 168; whereas if the traffic has not ended, the audio-to-VoIP conversion continues.

If, on the other hand, there is no TIAN module access point, then as illustrated at 170, the system monitors PAN and IAN traffic. Traffic from PAN/IAN is monitored and as illustrated at decision block 172, if there is TIAN traffic associated with the PAN/IAN, then this fact is passed to monitor 170. If, on the other hand, there is no TIAN traffic associated PAN/IAN, then as illustrated at 174, the system informs the TIAN cluster head that a PAN may be out of the access point coverage. This is passed to monitor 170 as well.

Note that the Network Operation Mode is responsible for the transfer and routing of voice, data, and video from the first responder's IAN/PAN to the TIAN. The Networking Operation Mode process begins by coordinating the TIAN modules IAN parameters with the TIAN cluster head. Some of the IAN parameters consist of the JAN that the IAN is supporting, the frequency and CTCSS tone that the IAN is operating on, and the air interface protocol that the IAN is supporting. The cluster bead will assign a TIAN module to be the TIAN access point for each unique IAN.

The TIAN module will process IAN/PAN network traffic differently depending on if it is assigned to be the TIAN access point for the associated IAN. If it is the TIAN access point, the TIAN module is responsible for providing the gateway function between the TIAN and the IAN/PAN. This consists of monitoring the networks for traffic, translating the traffic to the appropriate format, and the forwarding the traffic over the opposing network.

If the TIAN module is not assigned to be the TIAN access point, then it is to monitor the IAN and TIAN traffic to detect when an IAN subscriber PAN is out of range of the assigned TIAN access point. When the TIAN module detects IAN traffic but no associated TIAN traffic, the TIAN module is to inform the TIAN cluster head that it has detected an isolated subscriber device. The TIAN cluster head may then re-assign the TIAN access point to another TIAN module.

Fire Response to a Residential Fire Call

Figure 11:
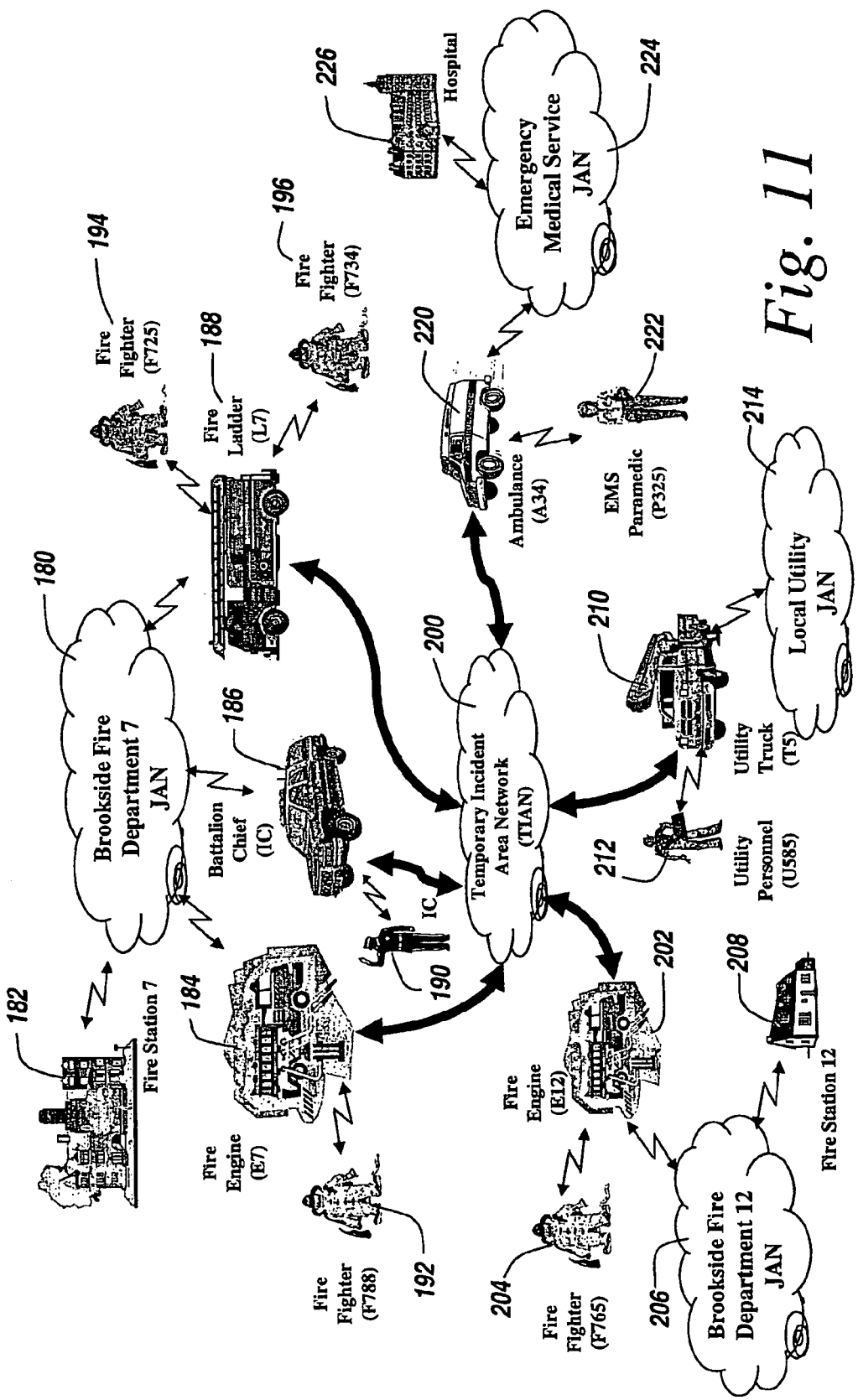
FIG. 11 is a diagrammatic illustration of a communications layout at the scene of an incident involving a response to a residential fire call.

Presented in FIG. 11 is an example of how the subject TIAN works when applied to the "Fire Response to a Residential Fire Call" scenario presented in the "PSWC&I Statement of Requirements" Version 1.0 11 Mar. 10, 2004, section 3.3.2, pages 10 and 11 by The SAFECOM Program—Department of Homeland Security.

Referring now to FIG. 11, what is presented is the fire response to a residential call utilizing the subject temporary incident area network. Here it can be seen that a Brookside Fire Department 7 network, here illustrated at 180, communicates with fire station 182 and to, for instance, a fire engine E7 here illustrated at 184, a battalion chief incident commander vehicle 186 and, for instance, a fire ladder L-7 truck 188. Note that an incident commander 190 is in charge of the scene.

It will be further noted that a fire fighter F-b 788, here illustrated at 192, communicates with his fire engine 184, whereas fire fighters F-725 and F-734, here illustrated at 194 and 196 communicate directly with their particular fire ladder 188, that in return communicates over the subject temporary incident area network, here illustrated at 200. The TIAN 200 permits intercommunication between, for instance, fire engine 184, battalion chief 190 and fire fighters 194 and 196 through fire ladder 188.

Also responding to the scene may be an additional fire engine 202 having an associated fire fighter 765, here illustrated at 204, which may be associated with a different Brookside Fire Department, Brookside Fire Department 12 JAN, here illustrated at 206. JAN 206 is in turn interconnected with fire station 12, here illustrated at 208.

What the provision of the TIAN modules does is to permit fire station 12, fire fighter 204 and fire engine 202 to intercommunicate with all those at the scene, even though they are from a different fire department.

Moreover, a utility truck 210 may arrive on the scene with utility personnel 212, with utility truck 210 being connected on a different proprietary network to local utility JAN 214. Again, the TIAN module at utility truck 210 permits communication between utility personnel and the rest of the responders at the scene.

Likewise, an ambulance 220 may arrive at the scene. The ambulance transports EMS paramedics 222 to the scene, with ambulance 220 being connected over its own proprietary network to an emergency medical service JAN 224, in turn directly connected to a hospital 226.

The TIAN module at ambulance 220 interconnects the paramedic with his emergency medical service department and also the hospital, while at the same time permitting the EMS paramedic to interface with either utility personnel 212, fire fighter 204, incident commander 190 or other fire fighters 192, 194 and 196.

It is noted that in the following scenario, the "PSWC&I Statement of Requirements" have been annotated with temporary incident area network interactions.

The first section hereinafter presents the fire response scenario and the second section provides the SAFECOMM fire communications summary.

Fire Response Scenario

1. At 3:17 a.m., the Brookside public safety answering point (PSAP) receives a 9-1-1 call from a cab driver that the apartment building at 725 Pine is smoking and appears to be on fire. From the CAD display, the dispatcher finds that the BFD-7 station is available and close to the address. The dispatcher notifies BFD-7 to send E7 and L7, and to send BFD-7 battalion chief as the fire's incident commander (IC). As E7 is leaving the fire station, firefighter F788 jumps onto the back of the vehicle. The vehicle registers that F788 has become part of the E7 crew for accountability and tracking. The dispatcher simultaneously sends a digital message providing the apartment building's address. The dispatcher notifies another Brookside Fire Department, BFD-12, to also send an engine to the fire (E12). By 3:19 a.m., E7, L7, and the incident commander leave BFD-7 and report their status to the dispatcher. As the incident commander's command vehicle leaves the station, a nearby wireless PSCD sends the apartment's building plans and the locations of nearby fire hydrants, the building's water connections, the elevator, and the stairwells to the command vehicle's GIS. The dispatcher sends a reverse 9-1-1 call message to all residents of the building, which has eight apartments on each of three floors. The nearest ambulance (A34) is alerted by the dispatcher to proceed to the scene. The local utility is alerted to stand-by for communications with the IC at 725 Pine.

2. The E7, L7, and IC drivers view the apartment's address on the cab monitor displays, which also maps the route for the drivers; a computer-activated voice tells the drivers what lane to be in and which turns to make. As the fire vehicles approach traffic lights along the route, the on-board signaling system changes the lights to the emergency vehicles' favor and the geo-location system provides the vehicles' location and progress on the dispatcher's CAD display. The on-board system also interrogates the county's transportation system for road closures, blockages, train conflicts, or slow traffic conditions to route the vehicles around impediments and provide the fastest route to the fire.

3. The IC arrives on scene at 3:22 a.m., activates his TIAN module, assesses the situation, noting that smoke and fire are visible, and alerts dispatch that 725 Pine is a working fire. The local utility truck (T5) arrives on scene and activates his TIAN module that automatically connects in an ad hoc fashion to the IC TIAN module and establishes a temporary incident area network (TIAN). The IC directs the local utility over the TIAN to shut off the gas to 725 Pine. As L7 and E7 arrive and get into position, they activate their TIAN module, which automatically connects to the established TIAN, and all fire personnel and equipment are shown on the IC's GIS display. The TIAN modules automatically set up the tactical communications channels for the IC and the fire crews. The fire crews are able to talk continuously with each other, reporting conditions and warning of hazards. Because the apartment building is not large enough to require a built-in wireless incident area network for emergency services, the first fire crew into the apartment drops self-organizing wireless TIAN modules on each of the floors at they progress through the building. Soon E12 and the assigned EMS module arrive on site, activate their TIAN module that automatically connects to the TIAN. The new personnel and equipment are automatically registered over the TIAN with the IC commander and a communication path is established over the TIAN. FIG. 11 shows a communication layout at the scene of incident and how the TIAN provides a connection between the first responders from different responding agencies.

4. Several families have already evacuated the building. As firefighters ask for their names and apartment numbers, they use the voice recognition capabilities of their PSCDs to capture the information, applying an RF ID wrist strap to each resident to track their status and location. Other firefighters enter the building to guide survivors out and to rescue those who are trapped. The IR cameras on the firefighter's helmets pass video over the TIAN to provide the IC a view of fire conditions within the building and where the hot spots are located. Additionally, the firefighters monitor the temperature of the surrounding air in their location. This information is directly available over the TIAN to the firefighter, as well as the IC and EMS module on-scene. Other passive sensors, such as hazardous gas detectors, are also operating in the firefighter's PAN and this data is distributed over the TIAN. With the IC's guidance, the firefighters search each apartment for survivors and the source of the fire. The IC is able to monitor the location of each firefighter and is aware of which apartments have been searched by the information provided on the GIS displays.

5. The EMS module outside the apartment uses the TIAN to monitor the vital signs of all the firefighters in and around the fire scene. The module alerts the IC that firefighter F725 is showing signs of distress and the IC orders F725 and his partner F734 out of the building for a check-up with the EMS team.

6. Firefighter F765 pushes his emergency button when he becomes disoriented in the smoke. The emergency call is sent as a priority message over the TIAN to the IC where an alarm is generated and a communication path is established between the IC and firefighter F765. The IC immediately directs firefighter F788 to his aid by providing F765's location relative to F788.

7. While the firefighters check every apartment for victims, the main fire is discovered in a second floor apartment kitchen where an electric range is burning. Two adults and two children are discovered in the apartment suffering from smoke inhalation. RF IDs are attached to their arms and each is given an oxygen tank and mask to help their breathing. They are carried outside the building where the EMS module is ready to take over medical aid.

8. While the firefighters put out the fire in apartment 202, the IC checks the GIS display, which shows where the fire personnel are and where all the survivors and rescued individuals live in the apartment building. Two top-floor apartments have not been searched and the IC moves fire personnel to those apartments. The apartment database indicates an invalid may be living in apartment 321. The firefighters break down the doors of both apartments and in 321 find a bedridden individual, who is in good condition, and a pet dog in the other apartment. Both are outfitted with RF ID devices and taken from the building.

9. The fire is brought under control. The IC releases E12 and the IC disconnects E12's TIAN modules from the IAN. E7 and L7 wrap their fire operations and A34 has to transport one fire victim to the hospital. The IC releases all remaining equipment, disconnects their TIAN modules, and gives control to dispatch.

Fire Communications Summary

Throughout the scenario, the fire personnel and equipment, EMS support personnel, and the fire victims interoperate over the TIAN. They are tracked by the TIAN providing geo-location information in real time, providing the Incident Commander with current accountability of public safety personnel and of the fire's victims. All victim information and vitals are recorded through TIAN wireless monitors and voice recognition systems with no reliance on paper reports and notes. All fire personnel and equipment have monitors to measure vital conditions and status that are reported by the wireless PAN and TIAN systems to the IC's GIS. The GIS also has access to city building department databases, which are searched and queried for building information and plans, fire hydrant locations, etc.

Mini Module and Situational Awareness

Figure 12:
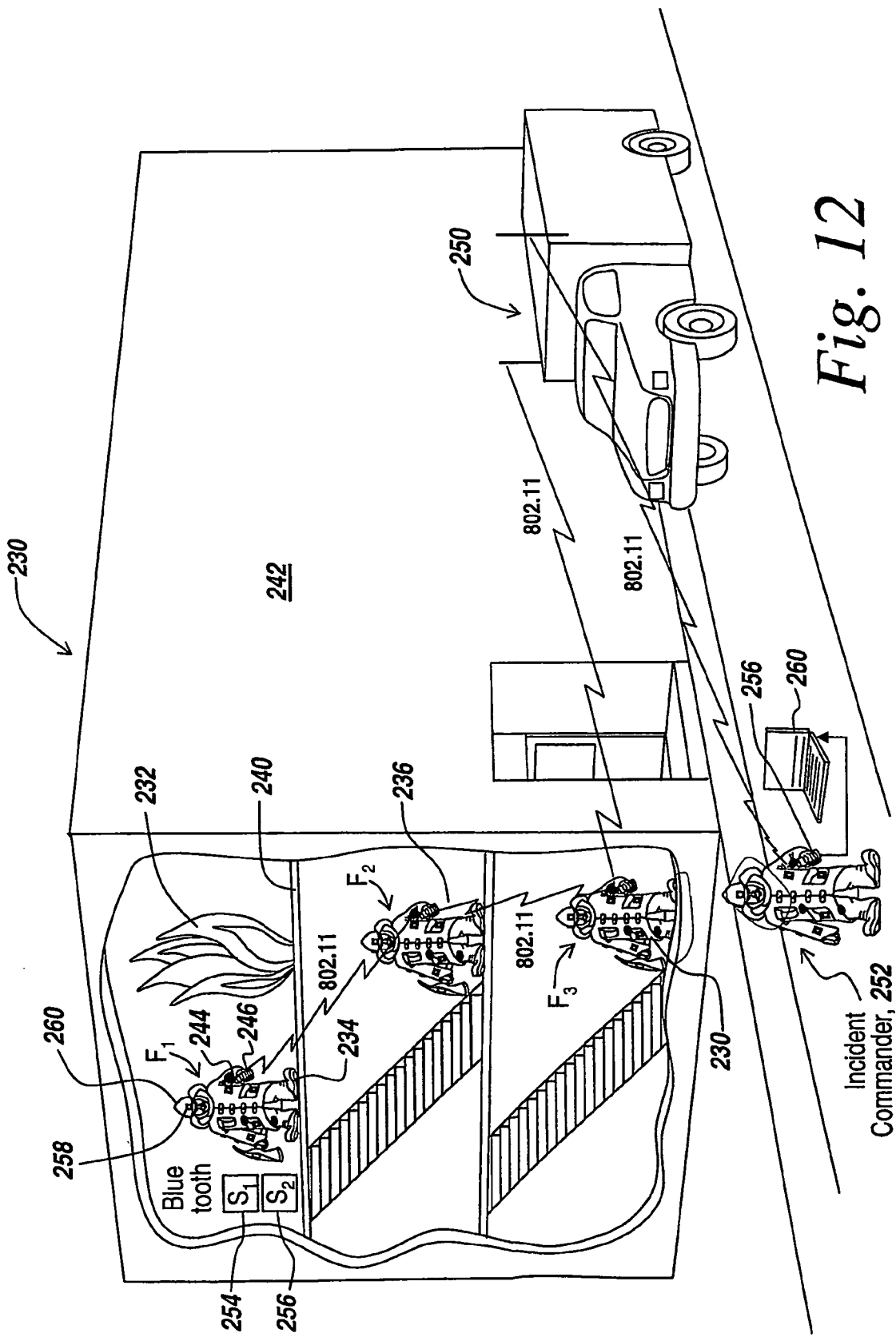
FIG. 12 is a diagrammatic illustration of emergency personnel using the subject mini module sensor data-image platform at an incident to show how conditions at the incident scene can be provided to an incident commander for situational awareness, also showing module range extending capability.

Referring now to FIG. 12, it will be appreciated that at an incident scene 230, there may be a fire 232 that is being responded to by a number of emergency personnel 234, 236 and 238, here pictured as firemen. Fireman 234 is pictured on the top floor 240 of a building 242 that is engulfed in flames.

Firefighter 234 has been provided with a standard public safety radio or transceiver 244 that is provided with a mini module 246 for establishing communication over the aforementioned ad hoc temporary incident area network through firefighter 236 and firefighter 238 to an incident command center vehicle 250 parked at the scene. The subject ad hoc network also communicates with an incident commander 252 who has coupled to his mini module 256 a laptop or PDA-type display device 260.

As illustrated, the network in one embodiment utilizes the 802.11 protocol to solve the interoperability problems so that any individual on a node on the network, namely firefighters 234, 236, 238 and incident commander 252, can intercommunicate using the subject interoperability technique provided by the modules.

As shown, there are sensors S1 and S2, here labeled 254 and 256, are deployed at the scene, which are used to sense conditions at firefighter 234, with the outputs of these sensors wirelessly coupled by Blue Tooth to mini module 236 so that the outputs of the sensors can be transmitted over the ad hoc network to the incident commander to provide the incident commander with situational awareness. As mentioned hereinbefore, these sensors could be temperature sensors; biometric sensors indicating the health and welfare of firefighter 234; or could include a camera 258 mounted on the helmet 260 of firefighter 234.

It is intended with the subject mini modules clipped or clamped to standard public safety radios or transceivers, that each of the public safety personnel may be outfitted with sensors and standard transceivers with the subject mini modules so that, with each individual constituting a node on the network, information from all of the nodes on the network can be transmitted over the network to the incident commander, or in fact to any other individuals on the network.

While as indicated above, portable modules can be dropped on the floor at various locations at the incident scene to extend the range of the normal handheld transceiver used by the emergency personnel, the subject mini module extends its own range by being able to communicate with other mini modules. Thus mini modules are a substitute for placing larger modules about the incident scene.

While larger modules can be carted up and deposited at various locations at the incident scene, the subject mini module system functions in the same way as the originally-described modules to provide range extension, but in this case for transmissions from the modules as opposed to transmissions from the standard transceivers.

While it may not be possible to get an 802.11 transmission from firefighter 234 to vehicle 250, the signal strength being inadequate, in the subject system, with each of the emergency personnel provided with a mini module, these mini modules can act as relay links having sufficient power to be able to robustly communicate not only verbal communications from the emergency personnel but also the data garnered by the sensors and cameras carried by each of the personnel.

Figure 13:
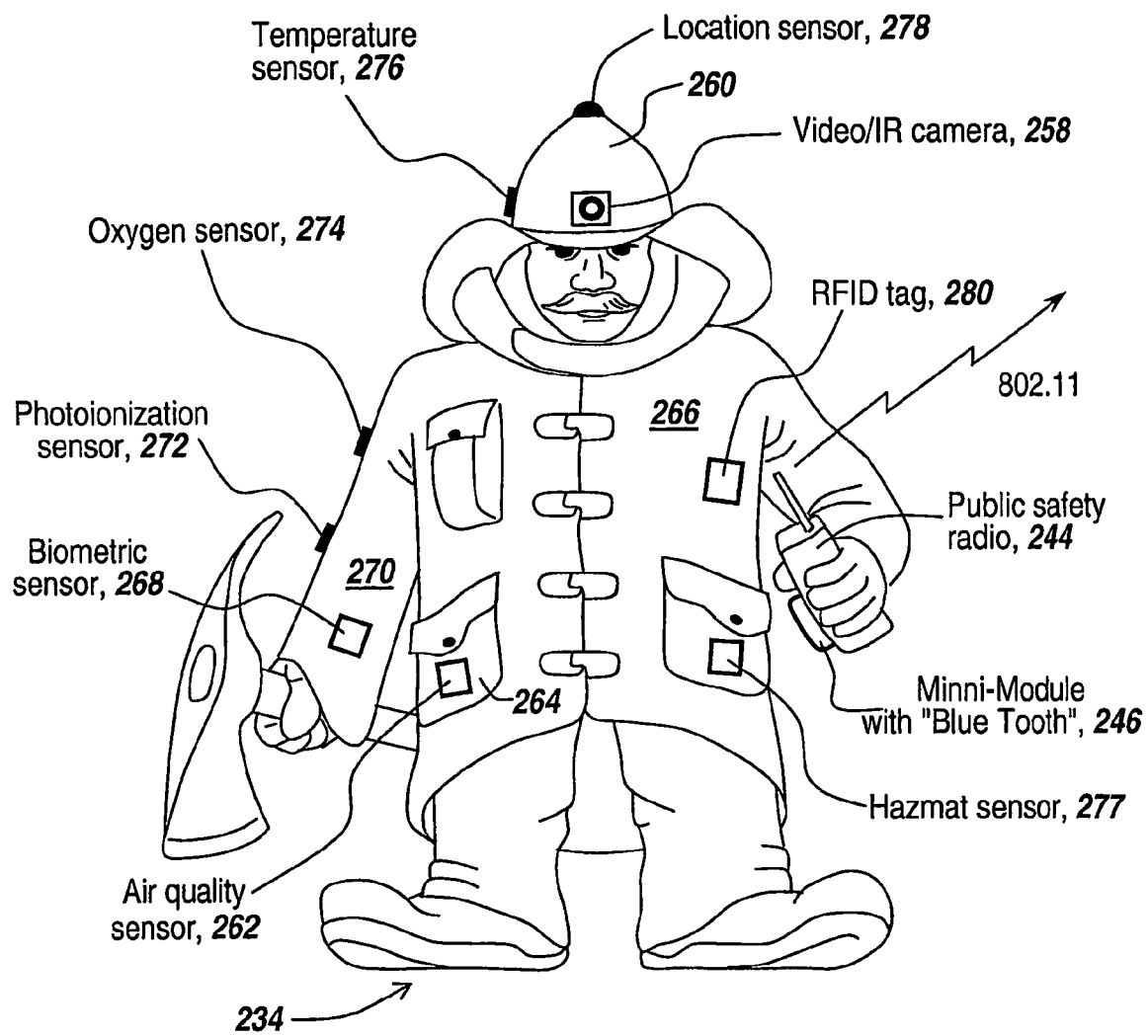
FIG. 13 is a diagrammatic illustration of a first responder outfitted with sensors and a camera coupled to a mini module attached to a standard handheld transceiver; and, FIG. 14 is a diagrammatic illustration of a standard public safety transceiver with a clip-on mini module to provide interoperability, and sensors and a camera coupled to the module to permit transmitting data collected at the scene over the ad hoc temporary incident area network.

Referring to FIG. 13, firefighter 234 can be provided with a number of sensors and a camera that, as shown here, can be attached to his garments or helmet. In this case, public safety radio transceiver 244 is provided with the aforementioned mini module 246, which also has Blue Tooth technology to be able to communicate wirelessly with sensors and the camera carried by the individual.

These sensors can include, for instance, an air quality sensor 262 carried on the pocket 264 of the individual's coat 266. Likewise, a biometric sensor 268 may, for instance, be attached to sleeve 270 of coat 266 and be able to pick up, for instance, blood pressure, respiration rate or any other of the biometric data that might be useful in determining the condition of individual 234. A photo ionization sensor 272 is shown attached to sleeve 270 as well as an oxygen tank sensor 274. A temperature sensor 276 is shown attached to helmet 260 along with video camera 258. Also a HAZMAT sensor 277 is provided.

As can be seen, attached to helmet 260 is a location sensor 278 that can be used with local GPS or location techniques to locate the individual within the scene. Moreover, an RF tag 280 is carried on coat 266 so that the presence and location of the individual wearing coat 266 may be identified by RFID techniques at some distance from the tag.

Figure 14:
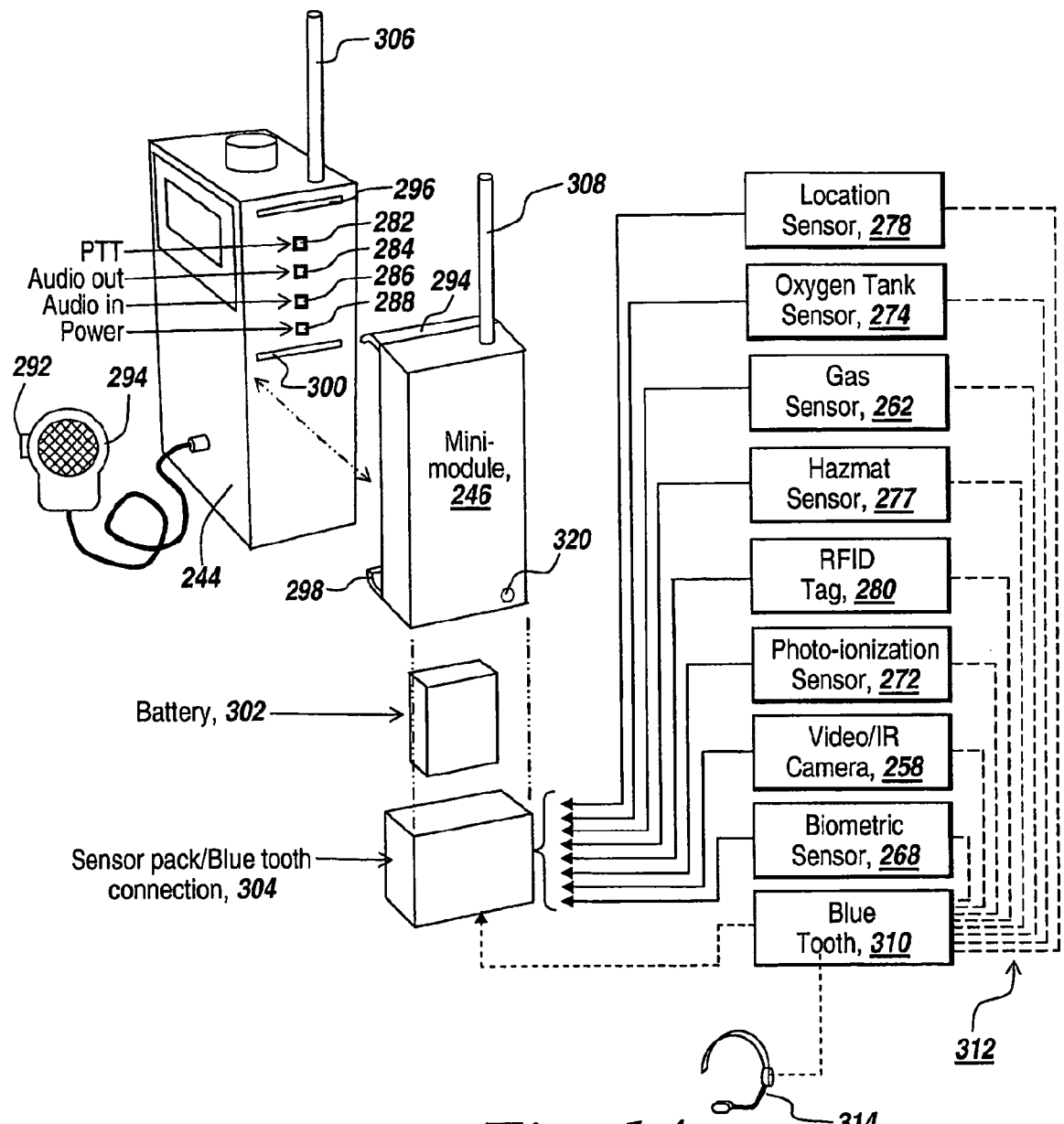

Referring now to FIG. 14, mini module 246 is shown attachable or clippable to public safety radio 244 provided with a number of contact pads 282, 284, 286 and 288 respectively coupling PIT, audio out, audio in, and power from transceiver 244 to mini module 246. It is noted that the transceiver is provided with a microphone 290 with a push-to-talk button 292, the depression of which is reported over contact pad 282.

In one embodiment mini module 246 is provided with a lip 294 that hooks into a companion top slot 296, with an extending member 298 fitting into bottom slot 300 in transceiver 244.

This is a common way of clipping on or attaching external circuits or plugs to standard public safety radios, with the contacts 282-288 being coupled to exposed contacts carried by the mini module to couple the appropriate signals to the mini module.

The mini module can be powered by the batteries contained in the handheld transceiver or it can be powered by its own battery, here shown at 302.

Also shown is a sensor pack/Blue Tooth connection module 304. Even without this module, it is possible to utilize the mini module with a standard public safety radio to provide verbal communications capability in an interoperable fashion. However, with module 304, sensor and image data may be transmitted over the network as well as verbal communications.

It is noted that public safety radio 244 is provided with the usual antenna 306 that communicates with an internal antenna (not shown) within mini module 246, with the mini module 246 being provided with an 802.11 or other antenna 308 to provide for ad hoc network communications.

As part of the subject invention, it is a feature that any module, be it a mini module or a standard module, can be provided with sensor inputs and image data inputs so as to be able to transmit information garnered from the scene over the ad hoc network. As a result, one can provide each of the emergency personnel with a variety of sensors, such as location sensor 278, oxygen tank sensor 274, gas or air quality sensor 262, HAZMAT sensor 277, photo-ionization sensor 272, and biometric sensor 268. The data gathering system also includes video/IR camera 258 and RFD tag 280 that may provide information such as an indication that the RF ID tag has been pinged by a suitable source.

All of these devices have outputs that can be hard-wired to the sensor pack/Blue Tooth connection module 304. More conveniently, however, each of these sensors can be provided with Blue Tooth communication capability to provide a wireless link of their outputs to mini module 246 via a wireless connection to module 304 through Blue Tooth circuits 310 either carried within each of the sensors or camera or as a separate unit to which each of the sensors and camera are connected as illustrated by dotted lines 312.

Also, a headset 314 may be wirelessly connected to the network by connecting it to mini module 246, to provide verbal communication either through radio 244 or through the mini module as desired.

Mini module 246 is also optionally provided with a fire wire, RS-232 or USB connector 320 so as to permit coupling of a laptop or PDA to a particular mini module to download the data that is circulating on the ad hoc network. This may be used by incident commander 252 of FIG. 12 to display data that is transmitted over the ad hoc network so as to provide for situational awareness based on the data collected by each of the individuals at each of the nodes of the network.

By knowing the location of the individual as well as the identity of the individual carrying the sensors and camera, one can provide a display for the incident commander of the individual's location, and the data available from him or her.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. For use on an ad hoc temporary incident area network a number of traditional transceivers;
a standalone add-on module including PTT control and audio in and out connectivity from the associated transceiver to said standalone add-on module for providing transceiver interoperability, said standalone add-on module adapted to be connected to one of said transceivers to automatically convert audio information available from the transceiver to which said module is coupled to a common format and frequency assigned to equipment operating on the temporary incident area network, thus to assure that all receivers on said ad hoc temporary incident network can intercommunicate;

a sensor coupled to said module for coupling sensor data to said module;

a circuit at said module for uploading sensor data to said network; and, a downloading unit at a node for downloading the sensor data carried by said network and for displaying said sensor data at said node, thus to reliably provide sensor data by using said network.

2. The apparatus of claim 1, and further including a camera at said module for providing image signals as an output thereof, said uploading circuit uploading said image signals.

3. The apparatus of claim 2, wherein said image signals include video signals.

4. The apparatus of claim 2, wherein said image signals include still picture signals.

5. The apparatus of claim 1, wherein said sensor is taken from the group consisting of location sensors, oxygen tank sensors, gas sensors, HAZMAT sensors, photo-ionization sensors and biometric sensors.

6. The apparatus of claim 1, and further including an incident commander terminal having a display coupled to said node and wherein the sensor data transmitted over said network is displayed for said incident commander at the associated incident commander display terminal, thereby to provide said incident commander with situational awareness based on said sensor data.

7. The apparatus of claim 6, wherein said module has a location and wherein said sensor data includes information relating to the location of said module and wherein said display includes a map and an icon indicating the location of said module.

\* \* \* \* \*